US006163275A

United States Patent [19]

Hartzell

[11] Patent Number: 6,163,275

[45] **Date of Patent: *Dec. 19, 2000**

[54] REMOTELY CONTROLLED DIMMER

[75] Inventor: Charles J. Hartzell, Hendersonville, Tenn.

[73] Assignee: Charles James Hartzell, Hendersonville, Tenn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/822,552

[22] Filed: Mar. 19, 1997

Related U.S. Application Data

[63] Continuation-in-part of application No. 08/417,810, Feb. 15, 1995, abandoned.

[51] Int. Cl.[7] .......... G02F 1/00

[52] U.S. Cl. .......... 340/825.72; 340/825.69; 340/825.22

[58] Field of Search .......... 340/825.72, 825.69, 340/825.57, 825.22; 323/324; 348/734

[56] References Cited

U.S. PATENT DOCUMENTS

| | | | |
|---|---|---|---|
| 4,712,105 | 12/1987 | Kohler | 340/825.69 |
| 4,807,052 | 2/1989 | Amano | 348/734 |
| 4,935,733 | 6/1990 | Munekata | 340/825.57 |
| 5,099,193 | 3/1992 | Moseley et al. | 323/324 |

FOREIGN PATENT DOCUMENTS

| | | | |
|---|---|---|---|
| WO 92/01968 | 2/1992 | WIPO | 340/825.72 |

*Primary Examiner*—Edwin C. Holloway, III

[57] ABSTRACT

The present invention discloses a system for remotely controlling a switch and a light. In the preferred embodiment, a conventional remote control is used to turn a light to a maximum setting. All received pulses thereafter within a given Null Time will smoothly reduce the electrical load thereby dimming the light. An indicator LED will be provided to demonstrate that the remote signal is reaching the remote switch. If the unit remains in an "on" condition or the Null Time, the next pulse will turn the light fully off. A learning mode is also provided which allows a button on a conventional remote to be pressed for a certain period of time. The switch will thereafter recognize that remote function key as the switch to control the light. The remotely controlled switch has a line interface electronically connected with the power supply. The power supply then electronically connects to an infrared sensor and a processor. The processor is electronically connected to an infrared sensor and a user interface as well as an isolation and control system. The isolation and control system is then electronically connected to the line interface.

6 Claims, 3 Drawing Sheets

REMOTELY CONTROLLED DIMMER

This applicant is a continuation-in-part of U.S. patent application Ser. No. 08/417,810 filed Feb. 15, 1995, now abandoned.

BACKGROUND OF THE INVENTION

The present invention relates generally to a remotely controlled attenuator and more particularly to a switch which enables a user to remotely control a light or other electrical system using a conventional remote control.

It will be appreciated by those skilled in the art that people are getting lazier and lazier all of the time. It will further be appreciated by those skilled in the art that infrared remotes are commonly used to control household appliances such as televisions, stereos, VCRs, and the like.

Attempts to remotely control a light or other electrical device are disclosed in patents such as U.S. Pat. Nos. 4,935,733; 4,712,105; and 5,099,193. Unfortunately, these patents suffer from common problems. Initially, the remotely controlled switches turn a light switch or other electrical device from "off" to various shades of brightness to "on." If the same button is switched again, an additional brighter step will be used. These devices are also subject to scatter from other infrared remote controls.

What is needed, then, is a system that can gradually dim a light or other electrical system. This needed system must also be capable of immediately turning the light switch or electrical system off if desired. This needed system must be capable to learning an off signal so that an otherwise unused portion of remote control can be used to prevent scatter. This system must be economical to manufacture. This system is presently lacking in the prior art.

SUMMARY OF THE INVENTION

The present invention discloses a system for attenuating an electrical load using a standard remote control. In the preferred embodiment, a conventional remote control is used to turn a light or other electrical equipment to a maximum setting. All received pulses thereafter within a given Null Time will smoothly reduce the electrical load thereby dimming the light. An indicator LED will be provided to demonstrate that the remote signal is reaching the remote switch. If the unit remains in an "on" condition or the Null Time, the next pulse will turn the light fully off. A learning mode is also provided which allows a button on a conventional remote to be pressed for a certain period of time. The switch will thereafter recognize that remote function key as the switch to control the light.

The remotely controlled switch has a line interface electronically connected with the power supply. The power supply then electronically connects to an infrared sensor and a processor. The processor is electronically connected to an infrared sensor and a user interface as well as an isolation and control system. The isolation and control system is then electronically connected to the line interface.

Accordingly, one object of the present invention is to provide a remotely controlled switch for controlling a light which can be operated by a conventional remote control.

Another object of the present invention is to provide a remote switch which is capable of learning.

Another object of the present invention is to provide a null time after which the key will turn the switch off.

Another object of the present invention is to provide a system which is economically and easily manufactured.

Another object of the present invention is to provide a switch which communicates to the individual whether the remote signal is reaching the switch.

DESCRIPTION OF THE PREFERRED EMBODIMENT

Figure 1:
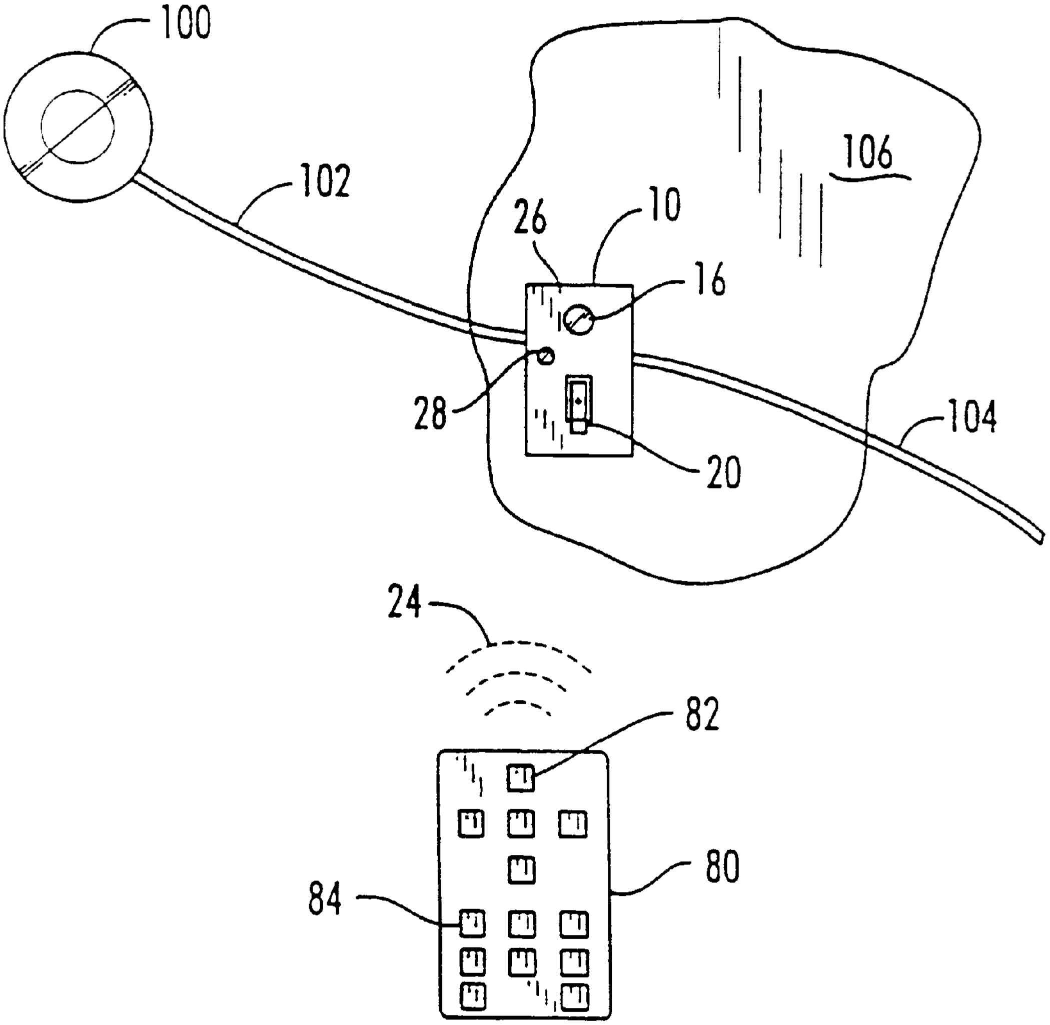
FIG. 1 is a perspective view of the conventional remote control and the remote control switch.

Referring now to FIG. 1, there is shown generally at 10 the remotely controlled attenuator of the present invention. As can be seen, switch 10 preferably mounts to wall 106. Switch 10 is preferably provided with a plate 26 to mount switch 10 to wall. Switch 10 has user interface 20 which is preferably a manual switch and an infrared sensor 16 which senses signals from an infrared signal 24 from conventional remote control 80. LED 28 or some other communication system is provided to allow user to recognize that infrared signal 24 is being received by switch 10. Conventional remote control 80 usually has channel buttons 82 and VCR control buttons 84. Switch 10 electronically communicates between light or other electrical device power source 102 and switch power source 104. Light power source 102 electronically communicates with light 100. Light or electrical device 100 can be any light such as an overhead light, a lamp, or any other electric device.

Figure 2:
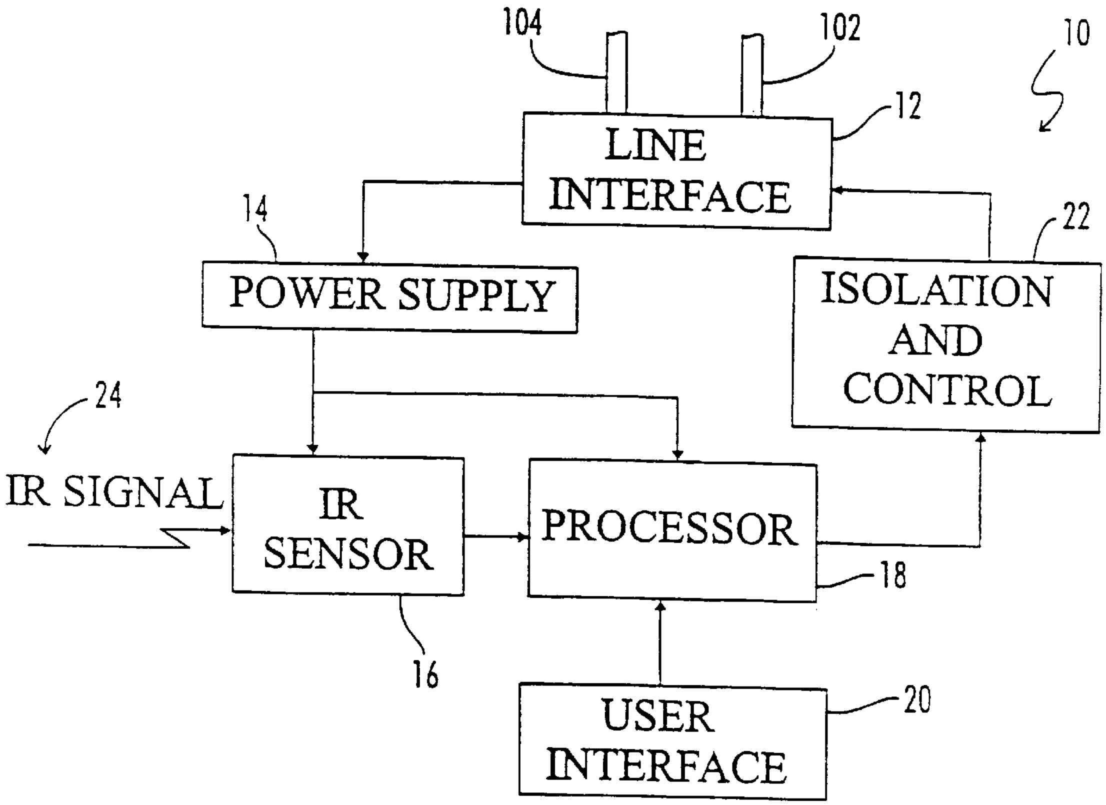
FIG. 2 is a block diagram of the preferred device of the present invention.

Referring now to FIG. 2, there is shown generally at 10 the block diagram of the present invention. As can be seen, power comes from switch power source 104 into line interface 12. Line interface 12 electronically communicates with power supply 14. Power supply 14 electronically connects to infrared sensor 16 and processor 18. Infrared signal 24 is senses by infrared signal 16. Processor 18 receives information from power supply 14, infrared sensor 16, and user interface 20. A signal is then directed to isolation and control 22 which then controls line interface 12 thereby controlling the amount of power directed to light power source 102.

Figure 3:
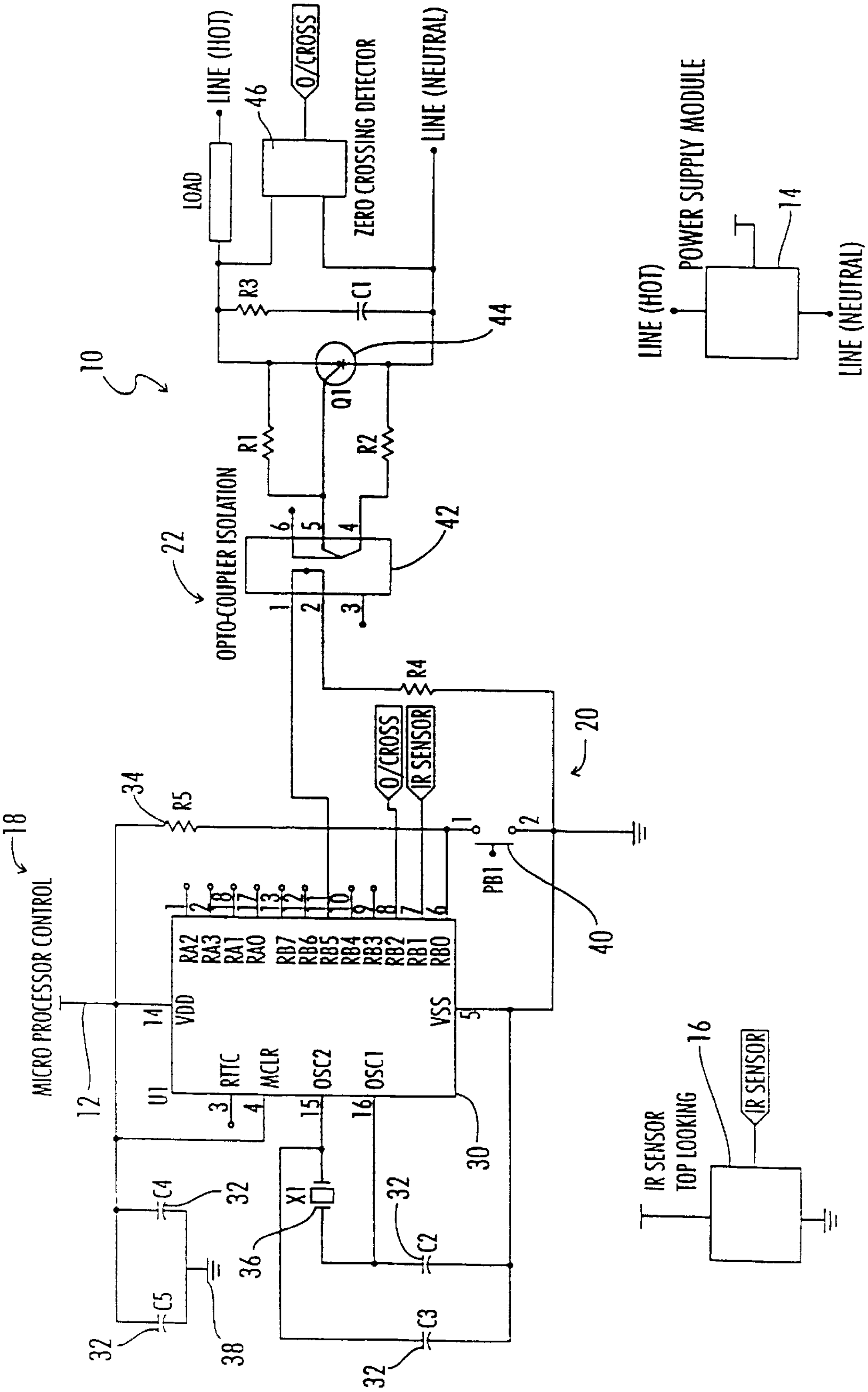
FIG. 3 is a schematic of the preferred device of the present invention.

Referring now to FIG. 3, there is shown generally at 10 the schematic of the device of the present invention. Power comes into line interface 12 into microprocessor control 18. Microprocessor 18 consists, primarily, of microprocessor 30 which is, preferably, AC 16C54 and is controlled in CN Assembler language. Various capacitors 32, resisters 34, crystals and grounds complete the circuit for microprocessor controller 18. User interface 20 is provided by push button 40 in the preferred embodiment. However, any type of user interface can be provided. In the preferred embodiment, sensor 16 is of the type manufactured by Litton under the product name IR Detector. In the preferred embodiment, power supply 14 is manufactured by Switch It, Inc. Processor control 18 is electronically connected to isolation and control 22 which is, preferably, optocontroller isolation 42, generally of the type manufactured by Quality Technologies. The time dimming is provided by zero crossing detector 46.

Referring now to FIGS. 1–3, one can generally see how device 10 works. Assuming that device 10 is in the off condition, the first signal that it receives from a conventional infrared remote 80 will cause it to go to an on state. Infrared signal 24 correctly received by switch 10 is indicated by flash of LED 28. In this state, device 10 will turn light 100 into full brightness. All subsequently received pulses will cause switch 10 to smoothly (preferably fifteen steps) dim the load or electricity and will simultaneously flash LED 28 until unit goes to an off condition. All reception of infrared signal 24 within two second null time delay will have no effect. If the unit remains in any of the on conditions regardless of brightness for a period of greater than the two second null time, the next pulse will immediately turn unit to an off condition.

The system also allows the operation of the learn mode. This mode can only be entered by use of the user's desired push button. The button must be continuously pressed until LED 28 flashed rapidly which indicates that the unit has switched to learn mode. In this mode, the unit will interpret a single key pressed continuously on the remote 80 as the only valid key which will cause the unit to operate. Unit 10 indicates that valid code has been learned when LED 28 goes steady. This mode is provided as means for preventing unintentional operation of the unit due to the infrared energy directed by another device as a television or VCR. It is intended that the code programmed into device 10 be a code which has no function to the television as a VCR control button 84. There is a cancel command for the code designed in the system. The system code is canceled by continuing to hold the button depressed once the LED flashes rapidly and then stops.

FIG. 2 can be used to describe the major components of the unit. Line interface 12 connects the power and load which are the light power source 102 and switch power source 104. Device 10 draws its power continuously from switch power source 104 and converts it into a low voltage in power supply block 14. Power supply block 14 also provides all the power for the rest of the circuitry. Infrared sensor block 16 preferably converts infrared signal 24 into voltage pulses which processor unit 18 can interpret. User interface consists of LED 28 at push button 20 which is used to manually control the operation of the unit. Processor block 18 also controls the timing and operation of the unit. The timing and state machine functions are contained in processing block 18. The isolation and control block 22 control the brightness.

As an example, a light switch is used. However, any electrical system can be controlled remotely such as, but not including, wall outlets, ceiling fans, power distribution systems, and load control systems.

Thus, although there have been described particular embodiments of the present invention of a new and useful remotely controlled dimmer, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A device for attenuating an electrical device using a conventional remote control comprising:

a. means for controlling amount of electricity to said electrical device;

b. means for receiving a signal from said conventional remote control;

c. means for learning an operating key from said conventional remote control, said controlling means responsive to reception by said receiving means of a signal corresponding to said learned operating key;

d. user interface means for manual input e. means for indicating learning status of said device; and f. means for canceling the learned operating key in response to a manual input continuously applied to the user interface means until said indicating means indicates that the learned operating key is canceled.

2. The device of claim 1 further comprising means for reducing said electricity to said electrical device.

3. The device of claim 1 wherein said means for controlling amount of electricity to said electrical device comprises a line interface.

4. The device of claim 1 wherein said means for receiving a signal from said conventional remote control comprises a sensor.

5. The device of claim 1 wherein said means for learning an operating key from said conventional remote control device such that said device will accept instructions from a particular remote control.

6. A device for operating a light using a conventional remote control comprising:

a. a line interface for interfacing between a switch power source and a light power source;

b. a power supply electronically connected to said line interface;

c. a sensor for receiving a signal from said conventional remote control electronically connected to said power supply;

d. a microprocessor electronically connected to said power supply and said sensor for processing said signal and said power, said microprocessor reading input from said conventional remote control to learn an operating key of said remote control;

e. a user interface electronically connected to said microprocessor; and f. an isolation and control electronically connected to said microprocessor and said line interface for controlling the amount of electricity passed through said line interface, said isolation and control responsive to signal from the microprocessor indicating reception by said sensor of a signal corresponding to said learned operating key;

g. an indicator to indicate learning status of said device; and h. said microprocessor canceling said learned operating key in response to a manual input continuously applied to the user interface until said indicator provides an indication that the learned operating key is canceled.

* * * * *